United States Patent
Ozeki et al.

(10) Patent No.: US 8,030,374 B2
(45) Date of Patent: Oct. 4, 2011

(54) POLYPHENYLENE ETHER BASED RESIN COMPOSITION

(75) Inventors: Juro Ozeki, Chiba (JP); Toru Yamaguti, Chiba (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 273 days.

(21) Appl. No.: 10/524,135

(22) PCT Filed: Aug. 8, 2003

(86) PCT No.: PCT/JP03/10169
§ 371 (c)(1),
(2), (4) Date: Apr. 5, 2006

(87) PCT Pub. No.: WO2004/016692
PCT Pub. Date: Feb. 26, 2004

(65) Prior Publication Data
US 2006/0241212 A1 Oct. 26, 2006

(30) Foreign Application Priority Data
Aug. 13, 2002 (JP) .............................. P.2002-235553

(51) Int. Cl.
| | |
|---|---|
| C08C 19/22 | (2006.01) |
| C08F 8/00 | (2006.01) |
| C08F 8/32 | (2006.01) |
| C08F 255/00 | (2006.01) |
| C08F 257/00 | (2006.01) |
| C08F 283/08 | (2006.01) |
| C08G 65/48 | (2006.01) |
| C08J 3/00 | (2006.01) |
| C08K 3/34 | (2006.01) |
| C08K 9/00 | (2006.01) |
| C08K 9/06 | (2006.01) |
| C08L 9/00 | (2006.01) |
| C08L 47/00 | (2006.01) |
| C08L 53/00 | (2006.01) |
| C08L 61/00 | (2006.01) |
| C08L 71/12 | (2006.01) |
| C08L 73/00 | (2006.01) |
| C09B 67/00 | (2006.01) |

(52) U.S. Cl. ........ 523/200; 523/205; 523/206; 523/209; 523/212; 523/213; 524/445; 524/502; 524/508; 525/98; 525/136; 525/250; 525/256; 525/259; 525/379; 525/390

(58) Field of Classification Search .................. 523/200, 523/205, 206, 209, 212, 213; 524/445, 502, 524/508; 525/98, 136, 250, 256, 259, 379, 525/390
See application file for complete search history.

(56) References Cited

U.S. PATENT DOCUMENTS

| | | | | | |
|---|---|---|---|---|---|
| 3,324,074 | A | * | 6/1967 | McManimie | 526/279 |
| 4,317,761 | A | | 3/1982 | Abolins | |
| 4,427,452 | A | * | 1/1984 | Jeffs | 524/262 |
| 4,433,114 | A | * | 2/1984 | Coran et al. | 525/332.6 |
| 5,115,035 | A | * | 5/1992 | Shiraki et al. | 525/314 |
| 5,332,784 | A | * | 7/1994 | Shiraki et al. | 525/98 |
| 6,635,700 | B2 | * | 10/2003 | Cruse et al. | 524/262 |
| 6,875,812 | B1 | * | 4/2005 | Akiyama et al. | 525/98 |

FOREIGN PATENT DOCUMENTS

| | | |
|---|---|---|
| EP | 0 065 009 B1 | 2/1986 |
| EP | 673975 A2 * | 9/1995 |
| EP | 0 798 339 A2 | 10/1997 |
| EP | 1 245 585 A2 | 10/2002 |
| JP | 2-127463 | 5/1990 |
| JP | 2001-011316 | 1/2001 |
| JP | 2002-201333 | 7/2002 |
| JP | 2003-277560 | 10/2003 |
| WO | WO-03/008466 A1 | 1/2003 |
| WO | WO-03/074574 A1 | 9/2003 |

* cited by examiner

Primary Examiner — Patrick Niland
(74) Attorney, Agent, or Firm — Finnegan, Henderson, Farabow, Garrett & Dunner, L.L.P.

(57) ABSTRACT

An object of the present invention is to prevent, in blending an inorganic filler for the purpose of improving rigidity of a thermoplastic resin, deterioration in impact resistance and surface smoothness caused by the inorganic filler. The invention relates to a polyphenylene ether based resin composition containing (a) from 10 to 93% by weight of a polyphenylene ether based resin and optionally a styrene based resin, (b) from 2 to 20% by weight of a styrene based thermoplastic elastomer modified with an imidazolidinone compound, and (c) from 5 to 60% by weight of an inorganic filler that has been surface treated with a silane compound.

5 Claims, No Drawings

POLYPHENYLENE ETHER BASED RESIN COMPOSITION

TECHNICAL FIELD

The present invention relates to an inorganic filler-reinforced polyphenylene ether based resin composition having excellent rigidity, impact resistance and surface smoothness.

BACKGROUND ART

Since polyphenylene ether based resins are excellent in light weight, processability, electrical insulation, etc., they are widely used in the automobile field, appliance field or OA instrument field, etc. The polyphenylene ether based resins have a defect such that the rigidity thereof is low as compared with metals, and therefore, a technique of blending it with an inorganic filler for the purpose of enhancing its rigidity is generally employed. In the case where an inorganic filler is added to a polyphenylene ether based resin, though the rigidity or mechanical strength is enhanced, the impact resistance and surface smoothness are lowered. Since polyphenylene ether based resins are amorphous resins, a degree of deterioration in the surface smoothness and impact resistance is extremely large compared with crystalline resins such as nylon resins and polyester resins, and therefore, this is a serious problem.

There is disclosed a technique in which a polyphenylene ether resin is blended with an impact resistance improving agent such as a styrene-butadiene-styrene ternary block copolymer or a hydrogenated product thereof and a clay having specific particle size and surface area, thereby obtaining a material provided with strong toughness (see Patent Document 1). However, according to such a technique, it is impossible to sufficiently avoid deterioration in strong toughness and surface smoothness due to the clay.

There is disclosed a technique of improving a balance between rigidity and impact resistance in blending a thermoplastic resin with an inorganic filler by carrying out the blending so that 30% or more of the interface of the inorganic filler particle is brought into contact with an elastic polymer (see Patent Document 2). As a specific example of the method of bringing the elastic polymer into contact with the interface of the inorganic filler particle, there is described a method in which talc having been surface treated with γ-glycidoxypropyl trimethoxysilane or γ-(2-aminoethyl)aminopropyl trimethoxysilane and a maleic anhydride-modified ethylene-propylene copolymer or a silane-modified ethylene-ethyl acrylate copolymer are previously mixed in the form of solution or in a molten state, and the mixture is then melt kneaded together with a thermoplastic resin such as nylon 6 and polybutylene terephthalate. In this case, according to the simultaneous melt kneading of the inorganic filler, the elastic polymer and the thermoplastic resin, the desired effect is not obtained. In the description of Patent Document 2, though polyphenylene ether resins are mentioned as an example of the thermoplastic resin. However, as can be seen from the working examples thereof, the description thereof is directed to an improved technique for crystalline resins such as nylon 6 and polybutylene terephthalate, and does not provide a technique for enhancing the balance between rigidity, impact resistance and surface smoothness of amorphous resins which suffer from an extremely large degree of deterioration in surface smoothness and impact resistance due to an inorganic filler as compared with crystalline resins. In addition, it is not preferable to previously mix the inorganic filler and the elastic polymer in a solution state because it takes time and large expense to dissolve the elastic polymer using a solvent and then removing the solvent. Also, the method of previously melt kneading the inorganic filler and the elastic polymer is not preferable, because not only is the method expensive, but also the method results in the deterioration of the impact resistance due to thermal deterioration of the elastic polymer.

There is disclosed a technique of improving the balance between impact strength, mechanical strength, tackiness and appearance by a composition composed of a primary or secondary amino group-containing hydrogenated conjugated diene compound-aromatic vinyl compound block copolymer and at least one kind of a non-polar polymer, a polar polymer, and a filler (see Patent Document 3). In the description of Patent Document 3, polyphenylene ether resins are described as an example of the non-polar polymer, and it is disclosed that inorganic fillers such as kaolin as examples of the filler may be silane-treated materials. However, as can be seen from the working examples thereof, the description thereof is directed to an improved technique for crystalline resins such as polyethylene terephthalate, polypropylene, polyamides, and blends of polypropylene and polymethyl methacrylate. Also it does not provide any example in which an inorganic filler is blended. Thus, it does not demonstrate an improved technique for a resin composition mainly comprising a polyphenylene ether resin and an inorganic filler.

Patent Document 1: JP 57-502063 T
Patent Document 2: JP 8-53624 A
Patent Document 3: European Patent No. 1245585A2

DISCLOSURE OF THE INVENTION

This invention has been made for the purpose of providing an inorganic filler-reinforced polyphenylene ether based resin composition having excellent rigidity, impact resistance and surface smoothness, which can be effectively used in the automobile field, appliance field or OA instrument field, etc.

For the purpose of imparting rigidity without substantially impairing impact resistance and surface smoothness, originally possessed by a resin composition comprising a polyphenylene ether based resin and a styrene based thermoplastic elastomer, the present inventors made extensive and intensive investigations. As a result, it has been found that by blending a polyphenylene ether based resin with a styrene based thermoplastic elastomer modified with an imidazolidinone compound and an inorganic filler that has been surface treated with a silane compound, impact resistance and rigidity are enhanced, a deterioration in surface smoothness which is usually generated by the addition of an inorganic filler is largely suppressed, and an IZOD impact value and elongation at break are rather enhanced compared with ones not blended with an inorganic filler, thereby leading to accomplishment of the purpose.

Specifically, the invention provides a polyphenylene ether based resin composition having excellent rigidity, impact resistance and surface smoothness, which comprises (a) from 10 to 93% by weight of a polyphenylene ether based resin and optionally a styrene based resin, (b) from 2 to 20% by weight of a styrene based thermoplastic elastomer modified with an imidazolidinone compound, and (c) from 5 to 60% by weight of an inorganic filler that has been surface treated with a silane compound.

BEST MODE FOR CARRYING OUT THE INVENTION

As the polyphenylene ether based resin referred to herein, which is component (a) of the invention, homopolymers (or copolymers) comprising the following general formula (1a) (and (1b)) as a constituent unit can be used.

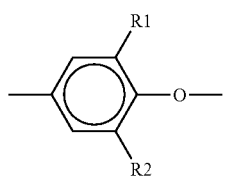

(1a)

In the formulae, R1, R2, R3, R4, R5, and R6 each represents a monovalent residue such as an alkyl group having from 1 to 4 carbon atoms, an aryl group, a halogen, or hydrogen, provided that R5 and R6 are not hydrogen at the same time.

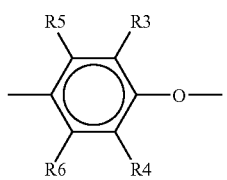

(1b)

Representative examples of homopolymers of the polyphenylene ether based resin include homopolymers such as poly(2,6-dimethyl-1,4-phenylene) ether, poly(2-methyl-6-ethyl-1,4-phenylene) ether, poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether, poly(2-methyl-6-chloroethyl-1,4-phenylene) ether, poly(2-methyl-6-hydroxyethyl-1,4-phenylene) ether, and poly(2-methyl-6-chloroethyl-1,4-phenylene) ether.

The polyphenylene ether copolymers include polyphenylene ether copolymers composed mainly of a polyphenylene ether structure such as a copolymer of 2,6-dimethylphenol and 2,3,6-trimethylphenol or o-cresol and a copolymer of 2,3,6-trimethylphenol and o-cresol.

Also, so far as the gist of the invention is not impaired, the polyphenylene ether based resin of the invention may contain, as a partial structure, various other phenylene ether units which have hitherto been proposed to be able to be present in the polyphenylene ether resin. Examples of phenylene ether units which can coexist in a small amount include 2-(dialkylaminomethyl)-6-methylphenylene ether units and 2-(N-alkyl-N-phenylaminomethyl)-6-methylphenylene units as described in JP 1-297428 A and JP 63-301222 A.

Also, a small amount of diphenoquinone or the like may be bonded to the main chain of the polyphenylene ether resin.

The styrene based resin referred to herein, which is optionally used as component (a), is a polymer obtained by polymerizing a styrene based compound, or a styrene base compound and a compound copolymerizable with the styrene based compound, in the presence or absence of a rubbery polymer.

The styrene based compound referred to herein means a compound represented by the general formula (2).

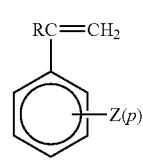

(2)

In the formula, R represents hydrogen, a lower alkyl, or a halogen; Z is selected from the group consisting of vinyl, hydrogen, a halogen, and a lower alkyl; and p represents an integer of from 0 to 5.

Specific examples thereof include styrene, α-methylstyrene, 2,4-dimethylstyrene, monochlorostyrene, p-methylstyrene, p-tert-butylstyrene, and ethylstyrene. Also, examples of the compound copolymerizable with the styrene based compound include methacrylic esters such as methyl methacrylate and ethyl methacrylate; unsaturated nitrile compounds such as acrylonitrile and methacrylonitrile; and acid anhydrides such as maleic anhydride. These compounds can be used together with the styrene based compound. Also, examples of the rubber polymer include conjugated diene based rubbers, copolymers of a conjugated diene and an aromatic vinyl compound or hydrogenated products thereof, and ethylene-propylene copolymer based rubbers. The polystyrene based resin which is especially suitable for the invention includes polystyrenes and rubber-reinforced polystyrenes. However, crystalline polystyrenes such as syndiotactic polystyrenes are not preferable because they have poor affinity with the polyphenylene ether resin.

In the invention, the styrene based resin in component (a) is added mainly for the purpose of dropping the heat-resistant temperature and thereby making processing easier. Accordingly, when that purpose is not required, it is not necessary to add the styrene based resin.

The styrene based thermoplastic elastomer referred to herein, which is component (b) of the invention, is a block copolymer having a polystyrene block and a rubber intermediate block. Examples of the rubber intermediate block include polybutadiene, polyisoprene, poly(ethylene•butylene), poly(ethylene•propylene), and vinylpolyisoprene. The rubber intermediate block may be a combination thereof. The alignment mode may be a linear type or a radial type. Also, the block structure of the polystyrene block and the rubber intermediate block may be any of a two blocks type, a three blocks type, or a four blocks type. For the purpose of the invention, a three blocks type linear type block copolymer comprised of a polystyrene-poly(ethylene butylene)-polystyrene structure is especially suitable, but a butadiene unit may be contained in the rubber intermediate block within a range not exceeding 30% by weight.

Examples of the imidazolidinone compound which is used for modifying the thermoplastic elastomer of component (b) of the invention include 1,3-diethyl-2-imidazolidinone, 1,3-dimethyl-2-imidazolidinone, 1,3-dipropyl-2-imidazolidinone, 1-methyl-3-ethyl-2-imidazolidinone, 1-methyl-3-propyl-2-imidazolidinone, 1-methyl-3-butyl-2-imidazolidinone, 1-methyl-3-(2-methoxyethyl)-2-imidazolidinone, 1-methyl-3-(2-ethoxyethyl)-2-imidazolidinone, 1,3-di-(2-ethoxyethyl)-2-imidazolidinone, 1,3-dimethylethylenethiourea, N,N'-diethylpropyleneurea, N-methyl-N'-ethylpropyleneurea, and 1,3-dimethyl-3,4,5,6-tetrahydro-2(1H)-pyrimidinone. Of these, 1,3-dimethyl-2-imidazolidinone is preferable.

The inorganic filler which is component (c) of the invention is one generally used for reinforcing thermoplastic resins.

Specific examples thereof include glass fillers, silica, wollastonite, alumina, talc, mica, clays, titanium oxide, zinc flower, iron oxide, calcium carbonate, and barium sulfate. Of these, mineral filers such as silica, talc, mica, and clays are suitable for the purpose of the invention, and clays having a mean size of primary particles of not more than 0.5 μm are especially suitable.

The shape of the inorganic filler is not particularly limited and may be any of a fibrous, flaky, acicular or granular shape. However, ones having a non-fibrous shape are preferable from the viewpoint of surface smoothness. For the purpose of meeting a balance between physical properties, the inorganic filler may be used in combinations of two or more kinds thereof.

The silane compound which is used for the surface treatment of the inorganic filler in component (c) of the invention is one generally used for the surface treatment of glass fillers or mineral fillers. Specific examples thereof include vinylsilane compounds such as vinyltrichlorosilane, vinyltriethoxysilane, and γ-methacryloxypropyl trimethoxysilane; epoxy silane compounds such as γ-glycidoxypropyl trimethoxysilane; sulfur based silane compounds such as bis-(3-triethoxysilylpropyl) tetrasulfide; mercaptosilane compounds such as γ-mercaptopropyl trimethoxysilane; and aminosilane compounds such as γ-aminopropyl triethoxysilane and N-phenyl-γ-aminopropyl trimethoxysilane. The silane compound may be used singly or in combinations of two or more kinds thereof. Also, a mixture of inorganic fillers that has been surface treated with a different silane compound can be used. For the purpose of the invention, mercaptosilane compounds or ones composed mainly of the subject compound are especially suitable.

As the component (c) of the invention, mineral fillers that have been surface treated with a mercaptosilane compound are suitable, and clays that have been surface treated with a mercaptosilane compound are more suitable.

In the invention, in the case where the component (b) is a styrene based thermoplastic elastomer modified with a 1,3-dimethyl-2-imidazolidinone compound, and the component (c) is a clay that has been surface treated with a mercaptosilane compound, it is possible to obtain a polyphenylene ether based resin composition having the most excellent balance between physical properties.

In the polyphenylene ether based resin composition of the invention, an aromatic phosphoric ester based flame retarder may be added as a component (d) according to the purpose. The aromatic phosphoric ester based flame retarder is not particularly limited. However, phosphoric esters of a triphenyl-substituted type such as triphenyl phosphate, tricresyl phosphate, trixylenyl phosphate, cresyldiphenyl phosphate, xylenyldiphenyl phosphate, dixylenylphenyl phosphate, hydroxynone bisphenol, resorcinol bisphosphate, and bisphenol A bisphosphate are suitably used. These may be used singly or in combinations of two or more kinds thereof.

In the invention, the amount of the styrene based thermoplastic elastomer modified with an imidazolidinone compound added, which is component (b), is chosen within a range of from 2 to 20% by weight. The amount added is preferably 2% by weight or more from the viewpoints of impact resistance and surface smoothness of the resin composition; and the amount added is preferably not more than 20% by weight from the viewpoints of rigidity and mechanical strength of the resin composition and prevention of layer separation of a molded article.

In the invention, the amount of the inorganic filler having been surface treated with a silane compound added, which is component (c), is chosen within a range of from 5 to 60% by weight. The amount added is preferably 5% by weight or more from the viewpoints of rigidity and mechanical strength of the resin composition; and the amount added is preferably not more than 60% by weight from the viewpoints of impact resistance and surface smoothness.

The amount added of the aromatic phosphoric ester based flame retarder which is component (d) is chosen within a range of from 5 to 30 parts by weight based on 100 parts by weight of the polyphenylene ether based resin composition of the invention. The amount added is preferably 5 parts by weight or more from the viewpoint of flame retardation; and the amount added is preferably not more than 30 parts by weight from the viewpoint of heat resistance.

In the resin composition of the invention, a stabilizer such as an antioxidant, an ultraviolet absorber, and a heat stabilizer, a plasticizer, an antistatic agent, a coloring agent, a mold releasing agent, and so on can be added as the need arises.

The method for the preparation of the composition of the invention is not particularly limited. However, in order to stably produce a large amount of the composition, an extruder is suitably used, and in particular, a twin-screw extruder provided with at least two feed ports is suitably used.

Though all of the respective components can be fed from a first feed port of the extruder and melt kneaded, these components can also be appropriately separated and fed from a first feed port and a second feed port. Incidentally, the component (d) is preferably fed from the second feed port.

It is preferred that the resin composition of the invention be obtained by one-time melt kneading. The method as disclosed in the above-described Patent Document 2 (JP 8-53624 A) (where the component (b) and the component (c) are previously melt kneaded to obtain pellets, which are then melt kneaded with the resin) is not preferred because the component (b) causes thermal deterioration.

The polyphenylene ether based resin composition of the invention has high rigidity and excellent surface smoothness. Though it is generally known that surface smoothness deteriorates when an inorganic filler is added, the resin composition of this invention has good surface smoothness, and the impact resistance and elongation at break thereof are enhanced compared with resin compositions to which the inorganic filler is not added. For this reason, the polyphenylene ether based resin composition of the invention has the advantages of polyphenylene ether based resins and has an excellent balance between rigidity, impact resistance and surface smoothness and is extremely useful as a molding material in the automobile field, appliance field or OA instrument field, etc.

EXAMPLES

The invention will be described below in detail with reference to the Examples, but it should not be construed that the invention is limited thereto. Incidentally, all the "part" and "%" are given by weight.

Respective physical properties shown in the Examples and Comparative Examples are those measured according to the following measurement methods with respect to specimens obtained by pelletizing a composition and injection molding the pellets.

(1) Drop Impact Strength (Impact Resistance):

Using a flat plate of 50 mm×90 mm×2.5 mm (thickness), the total absorption energy at break was measured at 23° C. by a falling weight type graphic impact tester manufactured by Toyo Seiki Seisaku-Sho, Ltd.

(2) Notched IZOD Impact Value (Impact Resistance):
Measured at 23° C. according to ASTM D256.
(3) Flexural Elastic Modulus (Rigidity):
Measured at 23° C. according to ASTM D790.
(4) Elongation at Break:
Measured at 23° C. according to ASTM D638.
(5) Gloss (Surface Smoothness):
Using a flat plate of 50 mm×90 mm×2.5 mm (thickness), the gloss in the center of the flat plate was measured by a gloss meter, GM-26D manufactured by Murakami Color Research Laboratory.

The raw materials to be used are as follows.

(a) Polyphenylene Ether Based Resin and Styrene Based Resin:

(a-1): Poly(2,6-dimethyl-1,4-phenylene) ether having a phenolic hydroxyl group in the one end terminal chain of the polymer and having an intrinsic viscosity (measured at 30° C. in a chloroform solvent) of 0.43 dL/g.

(a-2): Rubber-reinforced polystyrene, H9302 manufactured by PS Japan Corporation (b) Styrene Based Thermoplastic Elastomer:

(b-1): Functional group-free styrene based thermoplastic elastomer

Tuftec H1041 manufactured by Asahi Kasei Corporation (b-2): Styrene based thermoplastic elastomer having a carbonyl group 100 parts of Tuftec H1041 manufactured by Asahi Kasei Corporation, 1.0 part of maleic anhydride, and 0.5 parts of Perbutyl D manufactured by NOF Corporation were uniformly mixed and then melt kneaded at 260° C. using an extruder, thereby obtaining a styrene based thermoplastic elastomer having a functional group. The addition amount of maleic anhydride to H1041 as determined by the titration method with sodium methylate was found to be 0.4 parts.

(b-3): Styrene based thermoplastic elastomer modified with an imidazolidinone compound In a stirrer-equipped reactor that has been purged with a nitrogen gas, a block copolymer of a polystyrene-polybutadiene-polystyrene structure having a number average molecular weight of 40,000 and having 30% by weight of binding styrene and a 1,2-vinyl binding amount of butadiene of 38%, in which the polymer chain terminals exhibited a living lithium ion structure, was polymerized in a cyclohexane solvent using n-butyllithium as a polymerization initiator. After completion of the polymerization, 1,3-dimethyl-2-imidazolidinone in an amount of 1.5 molar times the lithium ion present in the polymer solution from the amount of the n-butyllithium used was added and allowed to react at 95° C. for 10 minutes. Thereafter, a hydrogenation reaction was continuously carried out quantitatively according to the method described in U.S. Pat. No. 4,501,857 until the ethylenically unsaturated binding amount of the polybutadiene segment became less than 20%, thereby obtaining a polymer having a hydrogenation rate of 81.6%. To the polymer solution after this hydrogenation reaction, was added 2,6-di-tert-butyl-p-cresol as a thermal deterioration stabilizer in an amount of 0.3 parts based on 100 g of the polymer, and cyclohexane as the solvent was removed by heating, thereby obtaining a styrene based thermoplastic elastomer having a polystyrene-hydrogenated polybutadiene-polystyrene structure, in which a secondary amine was added to the polystyrene chain terminals thereof.

(c) Inorganic Filler:

(c-1): Clay having a mean particle size of 0.2 µm and that has not been surface treated Polyfil HG90 manufactured by J.M. Huber Corporation, U.S.A.

(c-2): Clay having a mean particle size of 0.2 µm and having been surface treated with a mercaptosilane compound Nucap 290 manufactured by J.M. Huber Corporation, U.S.A.

(c-3): Clay having a mean particle size of 0.2 µm and having been surface treated with an aminosilane compound Nulok 390 manufactured by J.M. Huber Corporation, U.S.A.

(d) Aromatic Phosphoric Ester Based Flame Retarder:

(d-1): Bisphenol A bisdiphenyl phosphate, CR741 manufactured by Daihachi Chemical Industry Co., Ltd.

The extruder used is as follows.

A bent port-equipped ZSK25 twin-screw extruder manufactured by Werner & Pfleiderer Lebensmitteltechnik GmbH, Germany Example 1

The polyphenylene ether resin (a-1), the styrene based thermoplastic elastomer (b-3), the inorganic filler (c-2), and 2,6-di-tert-butyl-4-methylphenol (BHT) were fed from a feed port in the drive side of the twin-screw extruder, and the aromatic phosphoric ester based flame retarder (d-1) was fed from a feed port on the side surface of the extruder. The mixture was melt kneaded at a cylinder temperature of 300° C. and at a screw revolution of 250 rpm, thereby obtaining a resin composition. The test results of the physical properties of the subject resin composition are shown in Table 1.

Example 2

A resin composition was obtained by repeating Example 1, except for replacing the inorganic filler with (c-3). The test results of the physical properties of the subject resin composition are shown in Table 1.

Comparative Example 1

A resin composition was obtained by repeating Example 1, except for replacing the styrene based thermoplastic elastomer with (b-1). The test results of the physical properties of the subject resin composition are shown in Table 1.

Comparative Example 2

A resin composition was obtained by repeating Example 1, except for replacing the inorganic filler with (c-1). The test results of the physical properties of the subject resin composition are shown in Table 1.

Comparative Example 3

A resin composition was obtained by repeating Example 2, except for replacing the styrene based thermoplastic elastomer with (b-2). The test results of the physical properties of the subject resin composition are shown in Table 1.

TABLE 1

|  | Unit | Ex. 1 | Ex. 2 | Comp. Ex. 1 | Comp. Ex. 2 | Comp. Ex. 3 |
|---|---|---|---|---|---|---|
| Polyphenylene ether: | % | | | | | |
| a-1 | | 71.4 | 71.4 | 71.4 | 71.4 | 71.4 |
| Thermoplastic elastomer: | % | | | | | |
| b-1 | | | | 5.5 | | |
| b-2 | | | | | 5.5 | 5.5 |
| b-3 | | 5.5 | 5.5 | | | |
| Inorganic filler: | % | | | | | |
| c-1 | | | | | 22.0 | |
| c-2 | | 22.0 | | 22.0 | | |
| c-3 | | | 22.0 | | | 22.0 |
| BHT | % | 1.1 | 1.1 | 1.1 | 1.1 | 1.1 |
| Aromatic phosphoric ester based flame retarder: | Part | | | | | |
| d-1 | | 11.0 | 11.0 | 11.0 | 11.0 | 11.0 |
| Drop impact strength | J | 44 | 40 | 14 | 10 | 35 |
| IZOD impact value | J/m | 108 | 98 | 39 | 59 | 59 |
| Flexural modulus | MPa | 3800 | 3700 | 3800 | 3700 | 3750 |
| Elongation at break | % | 100< | 80 | 8 | 18 | 22 |
| Gloss | % | 88 | 80 | 50 | 48 | 72 |

Comparative Example 4

A resin composition was obtained by repeating Example 1, except that the inorganic filler (c-3) was not added. The test results of the physical properties of the subject resin composition are shown in Table 2.

Example 3

A resin composition was obtained by repeating Example 1 except for feeding a part of the polyphenylene ether resin (a-1) from the feed port on the side surface of the extruder. The test results of the physical properties of the subject resin composition are shown in Table 2.

Example 4

The polyphenylene ether resin (a-1), the styrene based resin (a-2), the styrene based thermoplastic elastomer (b-3), the inorganic filler (c-3), and BHT were fed from a feed port in the drive side of the twin-screw extruder. The mixture was melt kneaded at a cylinder temperature of 300° C. and at a screw revolution of 250 rpm, thereby obtaining a resin composition. The test results of the physical properties of the subject resin composition are shown in Table 2.

Comparative Example 5

A resin composition was obtained by repeating Example 4, except for replacing the styrene based thermoplastic elastomer with (b-1). The test results of the physical properties of the subject resin composition are shown in Table 2.

Comparative Example 6

A resin composition was obtained by repeating Example 4, except for changing the composition as shown in Table 2. The test results of the physical properties of the subject resin composition are shown in Table 2. Incidentally, layer separation was observed in the broken-out section of a molded article of the subject composition after a tensile test.

TABLE 2

|  | Unit | Comp. Ex. 4 | Ex. 3 | Ex. 4 | Comp. Ex. 5 | Comp. Ex. 6 |
|---|---|---|---|---|---|---|
| Polyphenylene ether: | % | | | | | |
| a-1 | | 71.4 | 71.4 (*1) | 32.7 | 32.7 | 32.7 |
| Polystyrene: a-2 | | | | 35.6 | 35.6 | 35.6 |
| Thermoplastic elastomer: | % | | | | | |
| b-1 | | | | | 5.9 | |
| b-2 | | | | | | |
| b-3 | | 5.5 | 5.5 | 5.9 | | 21.9 |
| Inorganic filler: | % | | | | | |
| c-1 | | | | | | |
| c-2 | | | 22.0 | | | |
| c-3 | | | | 24.8 | 24.8 | 24.8 |

TABLE 2-continued

| | Unit | Comp. Ex. 4 | Ex. 3 | Ex. 4 | Comp. Ex. 5 | Comp. Ex. 6 |
|---|---|---|---|---|---|---|
| BHT | % | 1.1 | 1.1 | 1.1 | 1.1 | 1.1 |
| Aromatic phosphoric ester based flame retarder: | Part | | | | | |
| | d-1 | 11.0 | 11.0 | | | |
| Drop impact strength | J | 42 | 45 | 43 | 4 | 8 |
| IZOD impact value | J/m | 39 | 104 | | | |
| Flexural modulus | MPa | 2500 | 3750 | 4300 | 4200 | 2400 |
| Elongation at break | % | 19 | 100< | | | |
| Gloss | % | 94 | 88 | 84 | 44 | 52 |

(*1): 38.5% of 71.4% was fed from the feed port on the side surface of the extruder.

While the invention has been described in detail and with reference to specific embodiments thereof, it will be apparent to one skilled in the art that various changes and modifications can be made therein without departing from the spirit and scope thereof.

This application is based on Japanese Patent Application No. 2002-235553 filed Aug. 13, 2002, Japanese Patent Application No. 2003-048752 filed Feb. 26, 2003, and Japanese Patent Application No. 2003-0055139 filed Mar. 3, 2003, the contents of which are herein incorporated by reference.

INDUSTRIAL APPLICABILITY

The polyphenylene ether based resin composition of the invention has excellent rigidity and surface smoothness and has excellent impact resistance and therefore, it can be effectively utilized for boxes, exterior parts, etc. in the automobile field, appliance field or OA instrument field, etc.

The invention claimed is:

1. A polyphenylene ether based resin composition comprising (a) from 10 to 93% by weight of a polyphenylene ether based resin and optionally also a styrene based resin, (b) from 2 to 20% by weight of a styrene based thermoplastic elastomer modified with an imidazolidinone compound, and (c) from 5 to 60% by weight of a clay that has been surface treated with a silane compound selected from the group consisting of an aminosilane compound and a mercaptosilane compound.

2. A polyphenylene ether based resin composition of claim 1 comprising 100 parts by weight of the resin composition and (d) from 5 to 30 parts by weight of an aromatic phosphoric ester based flame retarder.

3. The polyphenylene ether based resin composition of claim 1, wherein the mean primary particle size of the clay is not more than 0.5 µm.

4. The polyphenylene ether based resin composition of claim 1, wherein the polyphenylene ether based resin is poly (2,6-dimethyl-1,4-phenylene)ether.

5. The polyphenylene ether based resin composition of claim 1, wherein the styrene based thermoplastic elastomer modified with an imidazolidinone compound is an elastomer having a polystyrene-polybutadiene-polystyrene structure modified with 1,3-dimethyl-2-imidazolidinone.

* * * * *